| United States Patent [19] | [11] Patent Number: 4,774,302 |
|---|---|
| Haruyoshi et al. | [45] Date of Patent: Sep. 27, 1988 |

[54] PROCESS FOR PRODUCING PEROXIDE-VULCANIZABLE, FLUORINE-CONTAINING ELASTOMER

[75] Inventors: Haruyoshi Tatsu, Hitachi; Jun Okabe, Kitaibaraki; Akihiro Naraki, Kitaibaraki; Masatoshi Abe, Kitaibaraki; Yoshiaki Ebina, Kitaibaraki, all of Japan

[73] Assignee: Nippon Mektron Limited, Tokyo, Japan

[21] Appl. No.: 25,053

[22] Filed: Mar. 12, 1987

[30] Foreign Application Priority Data

Apr. 1, 1986 [JP] Japan ............................ 61-74484

[51] Int. Cl.$^4$ ............................ C08F 2/00; C08F 8/18
[52] U.S. Cl. ............................ 526/206; 525/326.4
[58] Field of Search ............................ 526/206; 525/326.4

[56] References Cited

U.S. PATENT DOCUMENTS

| 3,101,328 | 8/1963 | Edmonds, Jr. | 526/206 |
|---|---|---|---|
| 3,448,093 | 6/1969 | Grinniger et al. | 526/206 |
| 3,966,573 | 6/1976 | Bean | 526/206 |
| 4,243,770 | 1/1981 | Tatemoto et al. | 525/378 |
| 4,501,869 | 2/1985 | Tatemoto et al. | 525/387 |
| 4,564,662 | 1/1986 | Albin | 526/248 |
| 4,645,799 | 2/1987 | Wachi et al. | 525/314 |

FOREIGN PATENT DOCUMENTS 2815187 10/1978 Fed. Rep. of Germany ... 525/326.4

OTHER PUBLICATIONS

Hackh's Chemical Dictionary—Fourth Edition, Julius Grant, p. 60.

*Primary Examiner*—Joseph L. Schofer
*Assistant Examiner*—N. Sarofim
*Attorney, Agent, or Firm*—Fred Philpitt

[57] ABSTRACT

A peroxide-vulcanizable, fluorine-containing elastomer having distinguished processability, vulcanization characteristics and physical properties of vulcanized products can be obtained by polymerization of fluorine-containing olefins having 2 to 8 carbon atoms in the presence of a bromine or iodine-containing aromatic or perfluoroaromatic compound, polysubstituted with (1) bromine atoms or bromoalkyl groups (2) iodine atoms or iodoalkyl groups.

19 Claims, No Drawings

PROCESS FOR PRODUCING PEROXIDE-VULCANIZABLE, FLUORINE-CONTAINING ELASTOMER

BACKGROUND OF THE INVENTION

1. Field of the Invention

This invention relates to a process for producing a peroxide-vulcanizable, fluorine-containing elastomer, and more particularly to a process for producing a fluorine-containing elastomer having those halogen atoms in the molecule which can act as cross-linking points for peroxide vulcanization.

2. Description of the Prior Art

Generally, vulcanized fluorine-containing elastomers have distinguished heat resistance, solvent resistance, weathering and ozone resistances, creep resistance, etc., and are commercially widely used as a sealing material for oil seal, packing material, gasket, O ring, etc., or as a diaphragm material, a hose lining material, a coating material, an adhesive, etc.

One of the conventional processes for obtaining such a vulcanized, fluorine-containing elastomer is based on a peroxide vulcanization method using an organic peroxide as a vulcanizing agent, where fluorine-containing elastomers having iodine atoms or bromine atoms as cross-linking points are used. Some of the examples will be given below, and they have the following problems.

Japanese Patent Application Kokai (Laid-Open) No. 53-125,491 discloses a process using an iodine compound represented by the general formula Rf Ix, wherein Rf represents a fluorohydrocarbon group or a chlorofluorohydrocarbon group, but this iodine compound is expensive and highly toxic and readily liberates the iodine atoms bonded to the fluorine-containing elastomer, when exposed to light, as disclosed in the following Japanese Patent Application Kokai (Laid-open) No. 60-221,409.

Japanese Patent Application Kokai (Laid-open) No. 60-221,409, discloses a process using an iodine compound represented by the general formula $RI_{1-2}$, wherein R repesents a hydrocarbon group having 1 to 3 carbon atoms, and this bromine compound is cheap and less toxic than the said compound represented by Rf Ix, but is poor in the vulcanization speed, and the heat resistance and compression set strain of the vulcanized products.

Japanese Patent Applicaiton Kokai (Laid-open) No. 59-20,310 discloses a process using a bromine compound represented by the general formula $RBr_x$, wherein R represents a saturated aliphatic hydrocaron group. Inventors of this prior art invention are partly common to those of the prior art invention disclosed in the said Japanese Patent Application Kokai (Laid-open) No. 53-125,491 and state that the fluorine-containing elastomers having bromine atoms are superior in the properties than the said fluorine-containing elastomers having iodine atoms. Indeed, the fluorine-containing elastomers having bromine have a better light stability, but are poor in the vulcanization speed and the heat resistance and compression set of the vulcanized products.

Japanese Patent Publication No. 54-1,585 discloses a process using a brominated olefin compound such as bromotrifluoroethylene, 4-bromo-3,3,4,4-tetrafluorobutene-1, etc., but the thus obtained fluorine-containing elastomers are liable to undergo gelation and are not only poor in the processability (flow characteristics), but also unsatisfactory in the elongation and compression set of the vulcanized products.

Japanese Patent Application Kokai (Laid-open) No. 60-195,113 discloses a process for copolymerizing not more than about 5% by mole, preferably 0.1 to 1.5% by mole, of a vinyl ether monomer acting as a curing site, represented by the general formula:

ROCX=CYZ wherein one or two of X, Y and Z is selected from bromine and iodine atoms, the remainder being hydrogen, fluorine or chlorine atom, and R is a linear or cyclic alkyl group, or alkenyl group or allyl group, but this prior art has the same disadvantages as in the art of the said Japanese Patent Publication No. 54-1,585.

As a result of extensive studies on a process for producing a peroxide-vulcanizable, fluorine-containing elastomer capable of giving a vulcanized product having distinguished processbility, distinguished vulcanization characteristics and distinguished physical properties of vulcanized products to solve the problems encountered in the said prior arts, the present inventors have found that the problems can be effectively solved by using an aromatic compound as a bromine or iodine-containing compound in the polymerization of fluorine-containing olefins in place of the linear compound used in the said prior art.

SUMMARY OF THE INVENTION

An object of the present invention is to provide a process for producing a fluorine-containing elastomer having distinguished processability with respect to kneadability, flow characteristics, etc.

Another object of the present invention is to provide a process for producing a fluorine-containing elastomer having distinguished properties of vulcanized products, particularly, with respect to the tensile strength, elongation, heat resistance and compression set.

Other object of the present invention is to provide a process for producing a fluorine-containing elastomer having those halogen atoms in the molecule which can act as cross-linking points for peroxide vulcanization.

These objects can be attained by producing a peroxide vulcanizable, fluorine-containing elastomer through homopolymerization or copolymerization of fluorine-containing olefins having 2 to 8 carbon atoms in the presence of a bromine or iodine-containing aromatic or perfluoroaromatic compound, polysulstituted with (1) bromine atoms or bromoalkyl group or (2) iodine atoms or iodoalkyl group.

DETAILED DESCRIPTION OF THE PREFERRED EMBODIMENTS

The bromine or iodine-containing aromatic or perfluoroaromatic compound includes, for example, 1,2-dibromobenzene, 1,3-dibromobenzene, 1,4-dibromobenzene, 1,4-bis(2-bromoethyl)benzene, 1,2-dibromoperfluorobenzene, 1,3-dibromoperfluorobenzene, 1,4-dibromoperfluorobenzene, perfluoro[1,4-bis(2-bromoethyl)benzene], and diiodo compounds corresponding thereto. Preferably are benzenes or perfluorobenzenes having bromoalkyl group or iodoalkyl groups as substituents.

Generally, the bromine or iodine-containing aromatic or perfluoroaromatic compound can be bonded to the molecule terminals to give a fluorine-containing elastomer can effectively attain the cross-linking. To this end, the bromine or iodine-containing aromatic or perfluoroaromatic compound must be bonded thereto in an amount of about 0.001 to about 5% by weight, preferably about 0.01 to about 3% by weight, in terms of the bromine atoms or iodine atoms as contained in the resulting fluorine-containing elastomer. Below about 0.001% by weight, the cross-linking density of the fluorine-containing elastomer will be lowered, and no satisfactory vulcanization can be obtained, whereas above about 5% by weight, the vulcanized product will have a poor rubber elasticity, a poor heat resistance, etc.

The fluorine-containing olefins for use in the polymerizaiton according to the present invention preferably have 2 to 8 carbon atoms, for example, at least one of vinylidene fluoride, tetrafluoroethylene, hexafluoropropene, pentafluoropropene, chlorotrifluoroethylene, perfluoromethyl perfluorovinyl ether, perfluoroethyl perfluorovinyl ether, perfluoropropyl perfluorovinyl ether, and perfluoropropoxypropyl perfluorovinyl ether can be used. Besides, vinyl fluoride, trifluoroethylene, perfluorocyclobutene, perfluoro(methylcyclopropene), hexafluoroisobutene, 1,2,2-trifluorostyrene, perfluorostyrene, etc. can be also used.

These fluorine-containing olefins can be also copolymerized with at least one of olefinic compounds having 2 to 6 carbon atoms and fluorine-containing dienes having 4 to 8 carbon atoms.

The olefinic compound has 2 to 6 carbon atoms and includes, for example, olefins such as ethylene, propylene, butene; unsaturated vinyl esters such as vinyl acetate, and alkyl vinyl ethers such as methyl vinyl ether, ethyl vinyl ether, and is generally copolymerized in a proportion of about 0.1 to about 50% by mole as contained in the fluorine-containing elastomer.

The fluorine-containing diene has 4 to 8 carbon atoms, and includes, for example, perfluoro-1,3-butadiene, perfluoro-1,4-pentadiene, 1,1,2-trifluoro-1,3-butadiene, 1,1,2-trifluoro-1,4-pentadiene, 1,1,2,3,3-pentafluoro-1,4-pentadiene, perfluoro-1,7-octadiene, perfluorodivinyl ether, perfluorovinyl perfluoroalkyl ether, vinyl perfluoroalkyl ether, perfluorovinyl vinyl ether, etc. It is preferable that the fluorine-containing diene is copolymerized in a proportion of not more than about 1% by mole, as contained in the fluorine-containing elastomer. When copolymerized in a proportion above about 1% by mole, the copolymer elastomer undergoes considerable gelation, deteriorating the processability (flow characteristics) and the elongation of the vulcanized products.

Specifically, the fluorine-containing olefins copolymer includes, for example, hexafluoropropene-vinylidene fluoride copolymer, hexafluoropropene-vinylidene fluoride-tetrafluoroethylene terpolymer, tetrofluoroethylene-vinylidene fluoride-perfluoromethyl perfluorovinyl ether terpolymer, tetrafluoroethylene-vinylidene fluoride-perfluoropropyl perfluorovinyl ether terpolymer, tetrafluoroethyleneperfluoropropoxypropyl perfluorovinyl ether copolymer, tetrafluoroethylene-perfluoromethyl perfluorovinyl ether copolymer, tetrafluoroethylene-propylene copolymer, tetrafluoroethylene-vinylidene fluoride-hexafluoropropenepentafluoropropene quaternary copolymer, tetrafluoroethylene-hexafluoropropene-vinylidene fluoride-perfluoromethyl perfluorovinyl ether quaternary copolymer, tetrafluoroethylene-hexafluoropropene-hexafluoroisobutene terpolymer, tetrafluoroethylene-cyclohexyl vinyl ether copolymer, hexafluoropropene-vinylidene fluoride-chlorotrifluoroethylene terpolymer, etc.

The polymerization reaction of fluorine-containing olefins or that of the fluorine-containing olefins and the said comonomer is carried out in the presence of a bromine or iodine-containing aromatic or perfluoroaromatic compound by solution polymerization, suspension polymerization or emulsion polymerization according to the so far well known method. In case of solution polymerization, the polymerization reaction is carried out in a polymerization solvent of less chain transferability such as perfluoro(1,2-dimethylcyclobutane), perfluoro(1,2-dichloroethane), perfluoro(1,2,2-trichloroethane), perfluorocyclohexane, perfluorotributylamine, α,ω-dihydroperfluoropolymethylene, perfluoro(methoxypolyethoxy ethane), perfluorocyclobutane, tert-butanol, etc., using a polymerization initiator such as an organic peroxide, a fluorine-containing organic peroxide, an organic azo compound, a fluorine-containing organic azo compound, etc.

In case of suspension polymerization, the polymerization reaction is caried out while dispersing the monomers in water, using a polymerization initiator such as an organic peroxide, a fluorine-containing organic peroxide, an organic azo compound, a fluorine-containing organic azo compound, as such or in a solution in a solvent such as trifluorotrichloroethane, methyl chloroform, dichlorotetrafluoroethane, difluorotetrachloroethane, etc.

In case of emulsion polymerization, a water-soluble polymerization initiator such as an inorganic peroxide, for example, persulfates, hydrogen peroxide, perchlorates, etc.; an organic peroxide, for example, tert-butyl hydroperoxide, disuccinyl peroxide, etc. is used. An inorganic peroxide can be used as a redox system using a reducing agent such as sulfites, hyposulfites, ascorbic acid, etc. at the same time. The molecular weight of fluorine-containing elastomer can be adjusted with a chain transfer agent such as methanol, ethanol, isopentane, ethyl acetate, diethyl malonate, carbon tetrachloride, etc. Furthermore, in order to ensure stable dispersion of polymer particles in a polymerization solution, an increase in the polymer concentration and prevention of the polymer from deposition onto the wall of a polymerization vessel, an emulsifying agent such fluorine-containing carboxylates, fluorine-containing sulfonates, etc. can be used.

The said various polymerization reactions are carried out at a temperature in such a range as to advance the radical reaction and as not to occasion any depolymerization of formed polymers, generally at a temperature of $-30°$ to $150°$ C. Polymerization pressure is not particularly limited and a broad range of pressure can be used, depending upon the desired polymerization rate and degree of polymerization. In generally, the polymerization reaction can be carried out in a pressure range of about 1 to about 100 $kgf/cm^2$.

The fluorine-containing elastomer obtained according to the present invention can be cured according to various known vulcanization methods, for example, by peroxide vulcanization using an organic peroxide, by polyamine vulcanization using a polyamine compound, by polyol vulcanization using a polyhydroxy compound, or by irradiation of radiations, electron beams, etc. Above all, the elastomer cured by peroxide vulcanization can have a higher mechanical strength and a carbon-carbon bonds of stable structure at the cross-linking points. That is, the peroxide vulcanization can give vulcanized products having distinguished chemical resistance, solvent resistance, etc. and thus is particularly preferable.

The organic peroxide for use in the peroxide vulcanization includes, for example, 2,5-dimethyl-2,5-bis(tert-butylperoxy)hexane, 2,5-dimethyl-2,5-bis(tert-butyl-peroxy) hexine-3, benzoyl peroxide, bis(2,4-dichlorobenzoyl) peroxide, dicumyl peroxide, di-tert-butyl peroxide, tert-butyl cumyl peroxide, tert-butylperoxybenzene, 1,1-bis(tert-butylperoxy)-3,5,5-trimethyl cyclohexane, 2,5-dimethylhexane-2,5-dihydroxyperoxide, $\alpha,\alpha'$-bis(tert-butylperoxy)-p-diisopropylbenzene, 2,5-dimethyl-2,5-di(benzoylperoxy)hexane, tert-butylperoxyisopropyl carbonate etc.

In the peroxide vulcanization using the organic peroxide, a polyfunctional, unsaturated compound, such as tri(meth)allyl isocyanulate, tri(meth)allyl cyanulate, triallyl trimellitate, N,N'-m-phenylene bismaleimide, diallyl phthalate, tris(diallylamine)-s-triazine, triallyl phosphite, 1,2-polybutadiene, ethyleneglycol diacrylate, diethyleneglycol diacrylate, etc. can be usually used as a co-cross-linking agent to obtain more distinguished vulcanization characteristics, mechanical strength and compression set.

An oxide or hydroxide of divalent metal, such as oxides or hydroxides of calcium, magnesium, lead, zinc, etc. can be used as a cross-linking aid, depending upon the desired purpose. These compounds also act as an acid acceptor.

The foregoing components for the peroxide vulcanization system are used in the following proportion. About 0.1 to about 10 parts by weight, preferably about 0.5 to about 5 parts by weight, of the organic peroxide; about 0.1 to about 10 parts by weight, preferably about 0.5 to about 5 parts by weight, of the co-cross-linking agent; and not more than about 15 parts by weight of the cross-linking aid are used on the basis of 100 parts by weight of the fluorine-containing elastomer.

The foregoing components for the peroxide vulcanization can be blended and kneaded into the fluorine-containing elastomer directly as such or after diluted with carbon black, silica, clay, talc, diatomaceous earth, barium sulfate, etc., or as a master batch dispersion with the florine-containing elastomer. In addition to the foregoing components, so far well known filler, reinforcing agent, plasticize lubricant, processing aid, pigment, etc. can be appropriately added to the blend.

The present fluorine-containing elastomer can be also blended and co-cross-linked with other peroxide-cross-linking substances such as silicone oil, silicone rubber, fluorosilicone rubber fluorophosphazene rubber, ethylene-vinyl acetate copolymer, ethylene-acrylate copolymer, ethylene-propylene (-diene) copolymer rubber, acrylonitrile-butadiene copolymer rubber, acrylate rubber, etc.

Vulcanization can be carried out by heating after the said components have been blended according to an ordinary blending method, for example, by roll mixing, by kneader mixing, by banbury mixing, by solution mixing, etc. The heating is carried out generally in two steps or one step, i.e. by primary vulcanization at about 100° to about 250° C. for about 1 to about 120 minutes and by secondary vulcanization at about 150° to about 300° C. for 0 to 30 hours.

The fluorine-containing elastomer obtained according to the present invention is not only distinguished in the processability but also largely improved in the vulcanization characteristics by peroxide vulcanization and properties of vulcanized products (mechanical strength, elongation, heat resistance, compression set, etc.), and thus can be effectively used in any of the aforementioned applications.

The present invention will be described below, referring to Examples.

EXAMPLE 1

1,500 ml of deionized water and 7.5 g of ammonium perfluorooctanoate were charged into an autoclave having a net capacity of 3 l, and then 5 g of disodium hydrogen phosphate. 12 hydrates and 5 g of sodium hydroxide dissolved in 20 ml of deionized water were added thereto to adjust the pH. Then, an aqueous solution containing 1 g of ammonium persulfate in 10 ml of deionized water was added thereto, and the internal space atmosphere within the autoclave was fully replaced with a nitrogen gas. Then, the autoclave was fully cooled, and a gas mixture of vinylidene fluoride/tetrafluoroethylene/perfluoromethyl perfluorovinyl ether in a mixing ratio of 69/20/11 by mole and 8.3 g of perfluoro[1,4-bis(2-iodoethyl)benzene] were charged therein, and the internal pressure reached 46 kg/cm² gauge by elevating the internal temperature to 80° C. under stirring.

The internal pressure was decreased as the reaction advanced, and when the internal pressure was lowered to 4 kg/cm² gauge after the reaction time of 24 hours, the autoclave was cooled, and the residual gas was discharged to the outside to discontinue the polymerization reaction.

Then, an aqueous 18% sodium chloride solution was added to the thus obtained aqueous emulsion to coagulate the polymers. The polymers were washed with water and dried, whereby 330 g of rubbery polymers was obtained.

EXAMPLE 2

284 g of rubbery polymers was obtained in the same manner as in Example 1, except that the molar ratio of the gas mixture was changed to 70/20/10, and 8.0 g of 1,4-bis(2-bromoethyl)benzene was used in place of perfluoro[1,4-bis(2-iodoethyl)benzene.]

COMPARATIVE EXAMPLE 1

295 g of rubbery polymers was obtained in the same manner as in Example 2, except that 6.4 g of bromotrifluoroethylene was used in place of 1,4-bis(2-bromoethyl)benzene.

COMPARATIVE EXAMPLE 2

274 g of rubbery polymers was obtained in the same manner as in Example 1, except that the molar ratio of the gas mixture was changed to 70/15/15, and 5.8 g of 1-bromo-2,2-difluoroethylene was used in place of perfluoro[1,4-bis(2-iodoethyl)benzene].

EXAMPLE 3

1,500 ml of deionized water and 7.5 g of ammonium perfluorooctanoate were charged into an autoclave having a net capacity of 3 l, and the internal space atmosphere within the autoclave was fully replaced with a gas mixture of vinylidene fluoride/tetrafluoroethylene/hexafluoropropene in a ratio of 42/20/38 by mole. Then, the internal pressure was increased to 12 kg/cm² gauge with the gas mixture, and then 8.3 g of perfluoro[1,4-bis(2-iodoethyl)benzene] was charged thereto. The internal temperature was elevated to 80°

C., whereby the internal pressure reached about 16 kg/cm² gauge.

Then, 2 g of ammonium persulfate dissolved in 200 ml of deionized water was added thereto to initiate the polymerization reaction. The internal pressure was decreased as the reaction proceeded, and when the internal pressure was lowered to 15 kg/cm² gauge, it was again increased to 16 kg/cm² gauge with a gas mixture of vinylidene fluoride/tetrafluoroethylene/hexafluoropropene in a ratio of 58/22/20 by mole. The polymerization reaction was continued for 3 hours by repeating such pressurizing operations, and then discontinued by discharging the residual gas to the outside.

Then, an aqueous 18% sodium chloride solution was added to the thus obtained aqueous emulsion to coagulate the polymers. Then, the polymers were washed with water and dried, whereby 475 g of rubbery polymers was obtained.

20 parts by weight of MT carbon black, 1.5 parts ty weight of 2,5-dimethyl-2,5-di(tert-butylperoxy)hexane, 3 parts by weight of lead oxide and 4 parts by weight of triallyl isocyanulate were roll-kneaded with each of 100 parts by weight of the fluorine-containing elastomers obtained in the foregoing Examples and Comparative Examples. It was found that all the kneaded products had a good processability with respect to the kneadability, flow characteristics, etc.

The kneaded products were press-vulcanized at 160° C. for 10 minutes and then oven-vulcanized at 180° C. for 4 hours, whereby sheet-formed and O ring-formed vulcanized products were obtained.

Normal state physical properties and other properties of the vulcanized products were determined in the following manner. The results are shown in the following Table together with the intrinsic viscosity of fluorine-containing elastomers used, composition of comonomers in molar ratio (by 19F-NMR) and iodine or bromine content.

Normal state physical properties: by JIS K-6301

Heat aging resistance: A ratio of change in tensile strength was measured after exposed to 230° C. for 70 hours in a gear oven.

Compression set: P-24 O ring having a wire diameter of 3.5 mm, 25% compressed at 200° C. for 70 hours, was used for the measurement.

radical polymerization initiator a bromine or iodine-containing unsaturated cyclic or perfluoro unsaturated cyclic compound polysubstituted with (1) bromine atoms or bromoalkyl groups or (2) iodine atoms or iodoalkyl groups.

2. A process according to claim 1, wherein the bromine-containing aromatic compound is dibromobenzene.

3. A process according to claim 1, wherein the bromine-containing aromatic compound is bis(bromoalkyl)benzene.

4. A process according to claim 3, wherein the bromine-containing aromatic compound is bis(2-bromoethyl)benzene.

5. A process according to claim 1, wherein the iodine-containing aromatic compound is diiodobenzene.

6. A process according to claim 1, wherein the iodine-containing aromatic compound is bis(iodoalkyl)benzene.

7. A process according to claim 6, wherein the iodine-containing aromatic compound is bis(2-iodoethyl)benzene.

8. A process according to claim 1, wherein the bromine-containing perfluoroaromatic compound is dibromoperfluorobenzene.

9. A process according to claim 1, wherein the bromine-containing perfluoroaromatic compound is [perfluoro-bis(bromoalkyl)benzen].

10. A process according to claim 9, wherein the bromine-containing perfluoroaromatic compound is [perfluoro-bis(2-bromoethyl)perfluorobenzene].

11. A process according to claim 1, wherein the iodine-containing perfluoroaromatic compound is diiodoperfluorobenzene.

12. A process according to claim 1, wherein the iodine-containing perfluoroaromatic compound is [perfluoro-bis(iodoalkyl)-benzene].

13. A process according to claim 12, wherein the iodine-containing perfluoroaromatic compound is [perfluoro-bis(2-iodoethyl)-benzene].

14. A process according to claim 1, wherein the bromine or iodine-containing aromatic or perfluoroaromatic compound is used in an amount of 0.001 to 5% by weight in terms of bromine or iodine as contained in the fluorine-containing elastomer.

TABLE

| | Ex. 1 | Ex. 2 | Comp. Ex. 1 | Comp. Ex. 2 | Ex. 3 |
|---|---|---|---|---|---|
| Fluorine-containing elastomer | | | | | |
| Intrinsic viscosity ($\eta$) (MeEtCO, 35° C.) | 0.92 | 0.71 | 0.39 | 0.87 | 0.84 |
| Composition (Mol. %) | | | | | |
| $CH_2=CF_2$ | 65 | 65 | 67 | 68 | 60 |
| $CF_2=CF_2$ | 20 | 24 | 22 | 17 | 23 |
| $CF_3OCF=CF_2$ | 15 | 11 | 11 | 15 | — |
| $CF_3CF=CF_2$ | — | — | — | — | 17 |
| Iodine or bromine content (Wt. %) (Measurement results) | 0.32 | 0.29 | 0.31 | 0.42 | 0.36 |
| Normal state physical properties | | | | | |
| Hardness (JIS-A) | 66 | 67 | 66 | 65 | 72 |
| 100% modulus (kgf/cm²) | 29 | 32 | — | 38 | 36 |
| Tensile strength (kgf/cm²) | 141 | 158 | 43 | 107 | 232 |
| Elongation (%) | 240 | 208 | 90 | 188 | 425 |
| Heat aging resistance (% as a ratio of change in tensile strength) | −11 | −12 | −35 | −28 | −16 |
| Compression set (%) | 32 | 32 | >100 | 78 | 36 |

What is claimed is:

1. A process for producing a peroxide-vulcanizable fluorine-containing elastomer, which comprises homopolymerizing or copolymerizing fluorine-containing olefins having 2 to 8 carbon atoms in the presence of a 15. A process according to claim 1, wherein the fluorine-containing olefins can be copolymerized with at least one member of olefinic compounds of 2 to 6 carbon atoms and fluorine-containing dienes having 4 to 8 carbon atoms.

16. A process according to claim 15, wherein the olefinic compounds are used in an amount of 0.1 to 50% by mole as copolymerized in the fluorine-containing elastomer.

17. A process according to claim 15, wherein the fluorine-containing diene is used in an amount of not more than 1% by mole as copolymerized in the fluorine-containing elastomer.

18. A process for producing a peroxide-vulcanizable fluorine-containing elastomer, which comprises homopolymerizing or copolymerizing fluorine-containing olefins having 2 to 8 carbon atoms in the presence of a radical polymerization initiator a compound selected from the group consisting of bis(bromoalkyl)benzene, bis(iodalkyl) benzene, perfluoro[bis(bromoalkyl)benzene],perfluoro[bis(iodoalkyl)benzene].

19. A process for producing a peroxide-vulcanizable fluorine-containing elastomer, which comprises homopolymerizing or copolymerizing fluorine-containing olefins having 2 to 8 carbon atoms in the presence of a radical polymerization initiator a compound selected from the group consisting of a dibromobenzene, bis(2-bromoethyl)benzene, diiodobenzene, dibromoperfluorobenzene, perfluoro[bis-(2-bromoethyl)benzene, diiodoperfluorobenzene, perfluoro[bis(2-iodoethyl)benzene].

* * * * *